Aug. 4, 1931.  N. SKILLMAN  1,817,528
SELF LUBRICATING SELF ALIGNING BEARING AND METHOD OF FORMING SAME
Filed April 19, 1928

INVENTOR.
NEWTON SKILLMAN
BY
ATTORNEY.

Patented Aug. 4, 1931                                                        1,817,528

UNITED STATES PATENT OFFICE

NEWTON SKILLMAN, OF HIGHLAND PARK, MICHIGAN, ASSIGNOR TO O. & S. BEARING CO., OF DETROIT, MICHIGAN, A CORPORATION OF MICHIGAN

SELF-LUBRICATING SELF-ALIGNING BEARING AND METHOD OF FORMING SAME

Application filed April 19, 1928. Serial No. 271,378.

This invention relates to a self-lubricating self-aligning bearing and method of forming same, and has to do particularly with the provision of an extremely compact and inexpensive bearing for efficiently and noiselessly supporting and automatically aligning cross brake shafts for automobile chassis frames and the like.

While universal spherical bearings are generally old in the art, and recently have been applied to automobile frames for compensating for inaccuracies in initial fabrication and assembly, such bearings have involved relatively complicated and expensive design and construction and have not been conducive to long efficient wear.

It is the object of the present invention to provide a self-lubricating self-aligning bearing which is formed as a single compact bearing and supporting member, adapted to be directly applied to the chassis frame, and containing an inner spherical bearing member and lubricant impregnated fibrous bushing for noiselessly carrying a rotatable shaft and an outer spherical bearing member for positively clamping and supporting the inner bearing member in self-aligned position.

A novel feature of the present invention embodies the method of fabricating and forming this unit, wherein the supporting bracket and portion of the spherical outer bearing is formed as a single part, and the other half of the spherical outer bearing is formed of a stamped sheet metal member adapted to be secured into place to resiliently and positively lock the parts of the bearing in compact assembly.

In keeping with the general compactness and cheapness of my bearing member, I preferably utilize an inner spherical bearing member having an outer bearing member 1 of sheet metal and an inner bushing of woven fibrous material 2 impregnated with a suitable lubricant. In forming this inner bearing member, the fibrous material is preferably placed within a cylindrical piece of tubing and the same stamped into substantially spherical shape and the fibrous material subjected to radial pressure whereby to compress and compact the same to proper shape and size.

Around this inner spherical bearing member 1 I preferably place a strip of lubricant impregnated woven fibrous material 3. This fibrous material 3 is preferably of a width so as to fit the outer spherical surface of the bearing member 1, and of course is of such a length to form a complete annular bushing. This bushing 3 is preferably somewhat thicker than when compressed into final shape in the complete assembly.

Figure 1:
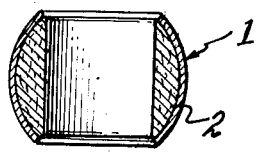
Fig. 1 is a longitudinal sectional view of the preferred form of inner spherical bearing member and lubricant impregnated fibrous bushing therefor.
Figure 2:
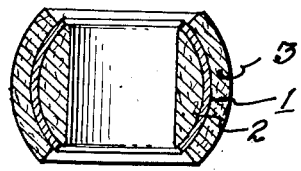
Fig. 2 illustrates the second step of my method of assembly and illustrates the positioning of the second layer of lubricant impregnated fibrous material around the effective bearing surface of the spherical inner bearing.
Figure 3:
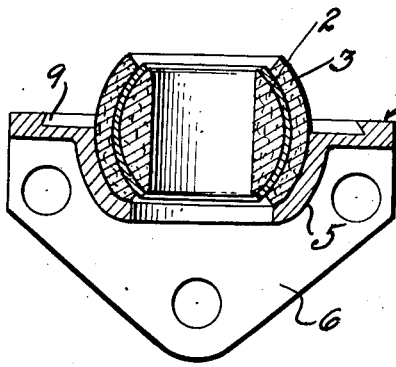
Fig. 3 is a detail view of the supporting bracket formed to include a portion of the outer spherical bearing, and illustrates the third step in the method of assembly.
Figure 4:
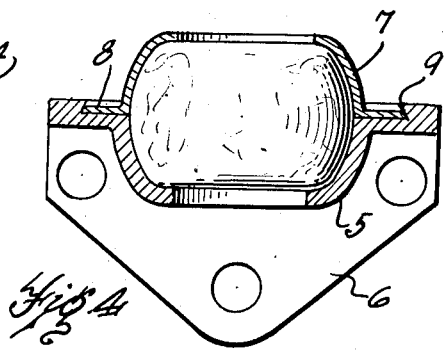
Fig. 4 is a view similar to Fig. 3 but illustrating a further step in assembly in that the other half of the outer spherical member is forced into place to compress the outer fibrous bushing.
Figure 5:
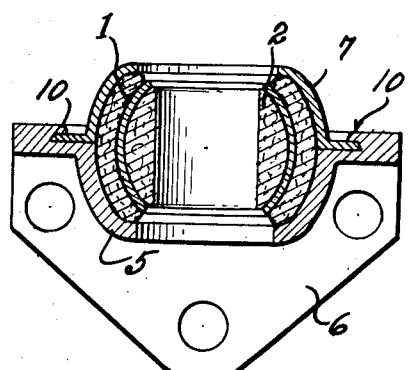
Fig. 5 is a longitudinal sectional view of the finally completed article showing the outer sheet metal half of the outer bearing clamped into place to lock the inner portion of the bearing in operating position.
Figure 6:
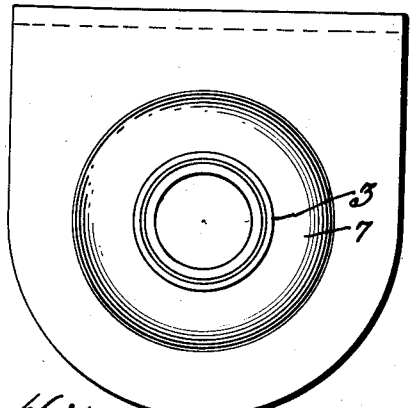
Fig. 6 is a plan view of the structure shown in Fig. 5.

This unit, as shown in Fig. 2, is then preferably inserted within the member 4 which not only comprises an annular half 5 of the outer spherical bearing member, but also is integrally formed to provide a base or supporting plate 6. As the fibrous bushing 3 is relatively large and uncompressed at this stage of the assembly, the inner bearing member and bushing 3 extend slightly above and beyond the normal position in the assembled bearing.

To complete the bearing unit, I preferably provide a second member 7 which forms the other half of the outer spherical bearing member. This member 7 is preferably an annular sheet metal stamping, and in assembly is merely pressed into place around the inner bearing member 1 and the outer layer of fibrous material 3. I prefer to apply considerable pressure to this member 7 so as to press the inner bearing member home and to compress the layer of fibrous material 3. The fit between the flange 8 of the member 7 and the annular depression 9 in the members 6 is preferably such that the flange 8 will snap into place and into final assembled position.

In order to positively secure a unit integral assembly, I preferably press or spin over the edge 10 of the annular groove 9 so as to lock the members 7 in assembled position.

It will thus be seen that I have provided a unitary integral bearing member which is self-lubricating, noiseless and self-aligning. The bearing is formed of a minimum number of parts of cheap construction and designed to permit a quick and inexpensive assembly. The parts are so arranged that the assembly thereof provides for the compression of the outer fibrous bushing, and the assembly of the outer bearing member not only locks the same in position but it is additionally positively locked in place so as to provide a bearing member which is not only rigid, but which embodies a unit adapted for long efficient use.

What I claim is:

1. The method of forming self-aligning self-lubricating bearings, which comprises forming an outer bearing member in two halves, one half comprising a portion of the outer bearing and an attaching support as an integral unit, and the other half consisting of a stamped sheet metal portion, inserting an inner spherical bearing member and a single outer layer of lubricant impregnated compressible material within one half of said outer bearing member, and then bringing the two halves of said outer bearing member together to shape and compress said outer layer of lubricant impregnated material and lock the inner spherical member in adjustable position.

2. The method of forming self-aligning self-lubricating bearings, which comprises forming an outer bearing member in two parts, one part comprising a portion of the outer bearing and an attaching support as an integral unit, and the other part consisting of a stamped sheet metal portion, inserting an inner spherical bearing member and a single outer layer of lubricant impregnated compressible material within one part of said outer bearing member, and then bringing the two parts of said outer bearing member together to shape and compress said outer layer of lubricant impregnated material and lock the inner spherical member in adjustable position, and locking said two parts together to form a permanent integral unit and maintain said material permanently compressed.

3. The method of forming unitary self-aligning self-lubricating bearings which comprises forming an outer spherical bearing in two annular halves, a portion of one half adapted to complementally fit within the other, inserting a spherical inner bearing member provided with an outer lining of lubricant impregnated compressible material within one of said members, then bringing said two halves together, positively locking the same due in said complemental relation and simultaneously compressing the outer lining of material and positively and permanently locking the inner spherical bearing member in position.

4. The method of forming unitary self-aligning self-lubricating bearings which comprises forming an outer spherical bearing in two annular halves, a portion of one half adapted to complementally fit within the other, inserting a spherical inner bearing member provided with an outer lining of lubricant impregnated compressible material within one of said members, and then bringing said two halves together and positively locking the same due in said complemental relation whereby the outer lining of fibrous material is compressed and the inner spherical bearing member positively locked in position, and additionally permanently locking said halves together by turning over the edges of one half within the circumference of the other half.

5. A self-aligning self-lubricating bearing, comprising a substantially spherical bearing member, a single strip of compressible lubricant impregnated material annularly positioned around the bearing surface of said bearing member, and a second bearing member consisting of two annular parts substantially semi-spherical in shape, one part forming a portion of the bearing member and attaching support, and the other part being formed of a stamped sheet metal portion, said parts being permanently locked together to form a permanent integral unit and to hold said material under compression.

6. A self-aligning self-lubricating bearing, comprising a substantially spherical bearing member, a strip of lubricant impregnated compressible material annularly positioned around said member, and an outer substantially spherical bearing member formed in two annular halves, one of said halves being provided with a flange and the other half being provided with an annular depression for receiving said flange, the assembly of said halves serving to compress said outer layer of material and hold said inner bearing member in position, and said flange and depression being so formed as to integrally and permanently secure said halves together.

7. A self-aligning self-lubricating bearing, comprising a substantially spherical inner bearing member adapted to be held in a fixed position, a strip of compressible lubricant impregnated bushing material annularly positioned around said spherical member, and an outer bearing member formed in two parts, one of said parts being inwarly formed to provide a portion of the bearing member and a support attaching part, and the other part being formed of a stamped sheet metal portion, said parts being locked together to form a permanent integral unit and to lock the inner bearing member in position by compression of said bushing material.

8. A self-aligning self-lubricating bearing structure, comprising a substantially spherical inner bearing member adapted to be held in a relatively fixed position, a bushing of lubricant impregnated compressible material positioned around the substantially spherical bearing surface of said member, and an outer bearing member formed in two parts, one part being fabricated to form a portion of said outer bearing and a supporting member as an integral unit, the two parts being locked together to form a permanent bearing unit and to compress said bushing and lock the substantially spherical inner bearing member in position.

9. Bearing structure of the type described, comprising a substantially spherical inner bearing member adapted to be held in relative fixed position, a bushing of compressible material positioned around the substantially spherical bearing surface of said inner member, and an outer enclosing bearing member formed of two parts, said two parts being locked together to compress said bushing around said substantially spherical inner bearing member and lock the same in position, said inner bearing member being completely positioned within said outer bearing member, and said outer bearing member bearing upon the ends of the bushing as well as the sides to securely lock the same in compressed position.

10. A self-aligning, self-lubricating bearing, comprising a substantially spherical inner bearing member, a bushing of compressible material positioned around the inner bearing member, and an outer bearing member formed in two parts, one part being turned in at one end thereof to receive one end of the bushing, said part also having a support attaching part formed integrally therewith, the other part of said bearing contacting with the other end of said bushing to assist in compressing the same around the inner spherical member, the upper edge of said first named part cooperating with said second part and having a portion thereof spun over to form a permanent outer bearing unit and to permanently lock the inner bearing member in position and hold the bushing material under compression whereby it acts expansively against said inner bearing member and the inner surface of said outer bearing member.

11. The method of forming self-lubricating, self-aligning bearings, which comprises positioning an annular layer of lubricant impregnated compressible material and an inner bearing unit having a surface of longitudinally varying contour within one part of an outer bearing member, one end of the outer bearing member being curved inwardly to prevent an opening of less diameter than the inner bearing unit, bringing another part of the outer bearing member into interfitting relation with the first named part of said outer bearing member and into contact with the compressible material, said second outer bearing part so contacting with said compressible material as to shape and compress said lubricant impregnated material around the inner bearing unit and between the outer surfaces of said inner bearing unit and the inner surfaces of said outer bearing member, whereby said material acts expansively against the surfaces of the inner bearing unit and the outer bearing member, and then distorting a portion of one part of the outer bearing member to engage and hold the other part of the outer bearing member in assembled position to permanently lock the inner bearing unit in adjustable position and maintain said material permanently compressed.

12. The method of forming self-lubricating, self-aligning bearings, which comprises forming an outer bearing unit in two parts, said parts having preformed inner bearing surfaces, inserting a layer of lubricant impregnated compressible material and an inner bearing unit having a surface of longitudinally varying contour in one of said preformed parts, placing said material under compression and locking the inner bearing unit in position by the assembly of said two preformed parts, and distorting a portion of one of said parts to contact with the other part to form a permanent outer bearing member to hold said material under compression.

In testimony whereof I affix my signature.

NEWTON SKILLMAN.